E. T. PALMENBERG.
DISPLAY FORM.
APPLICATION FILED APR. 6, 1918.
1,274,317.
Patented July 30, 1918.
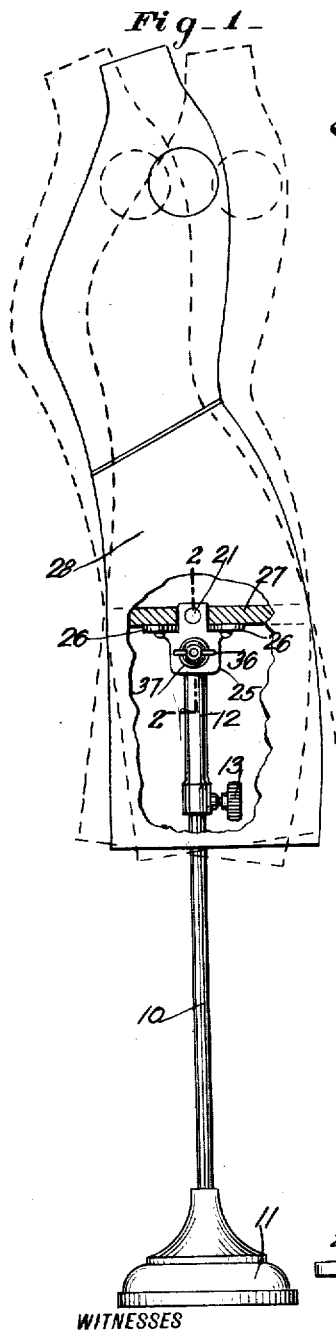
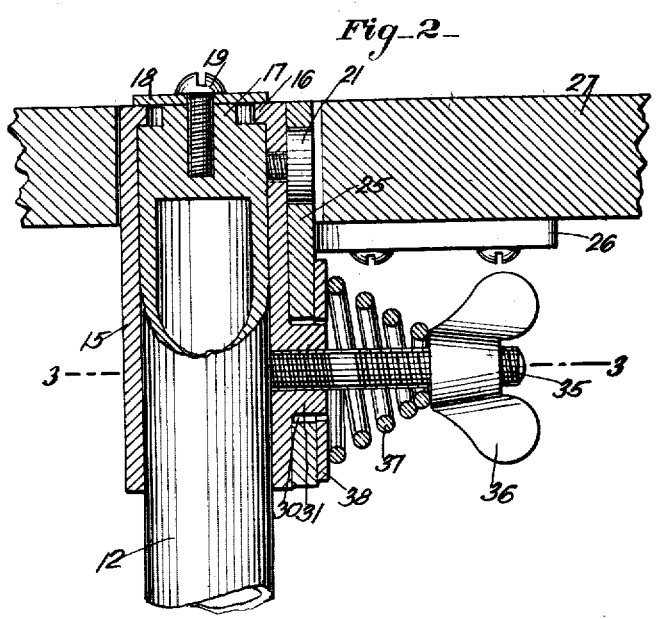
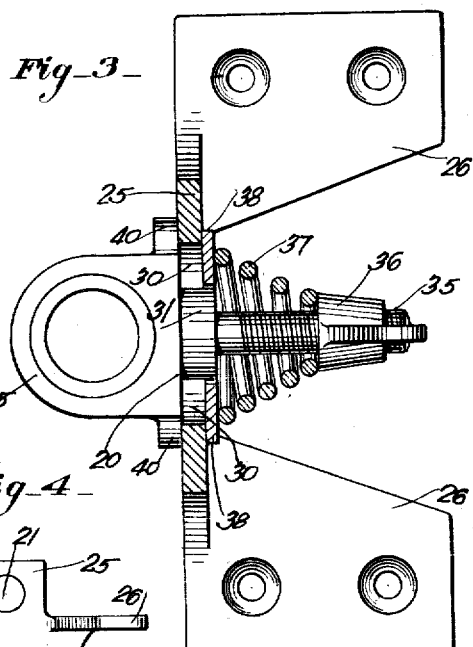
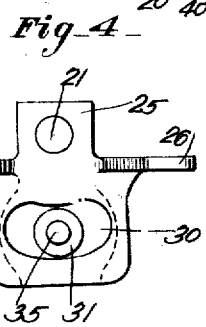
WITNESSES
Frank C. Palmer
Theo. J. Hostetz
INVENTOR
Emil T. Palmenberg
BY Munn & Co.
ATTORNEYS

UNITED STATES PATENT OFFICE.

EMIL THEO. PALMENBERG, OF NEW YORK, N. Y., ASSIGNOR TO J. R. PALMENBERG'S SONS, INC., OF NEW YORK, N. Y., A CORPORATION OF NEW YORK.

DISPLAY-FORM.

1,274,317.        Specification of Letters Patent.        Patented July 30, 1918.

Application filed April 6, 1918. Serial No. 227,129.

*To all whom it may concern:*

Be it known that I, EMIL THEO. PALMENBERG, a citizen of the United States, and a resident of the city of New York, borough of Manhattan, in the county and State of New York, have invented new and useful Improvements in Display-Forms, of which the following is a full, clear, and exact description.

The object of the invention is to provide certain new and useful improvements in display forms whereby the user is enabled to readily tilt the body of the form in a forward or backward direction to give the desired pose to the body and to hold the body in the adjusted position.

In order to accomplish the desired result, use is made of a socket or a sleeve mounted to turn on the form stand, a bracket mounted to swing on the said socket and to which the body of the display form is secured to permit of tilting the display form forward or backward, and a spring tension device for the said bracket to hold the latter and the body of the display form in the tilted position.

A practical embodiment of the invention is represented in the accompanying drawings forming a part of this specification, in which similar characters of reference indicate corresponding parts in all the views.

Figure 1 is a side elevation of a display form provided with the improvements, parts being shown in section;

Fig. 2 is an enlarged sectional front elevation of the same on the line 2—2 of Fig. 1;

Fig. 3 is an inverted sectional plan view of the same on the line 3—3 of Fig. 2; and Fig. 4 is a side elevation of the bracket and socket or sleeve.

The tubular stand 10 of the display form is provided with a suitable base 11 and with an extension 12 adapted to be fastened in place on the stand 10 by a set screw 13. On the upper end of the extension 12 of the stand 10 is mounted to turn a socket or a sleeve 15 provided at its upper end with an inwardly extending flange 16 resting on top of the stand extension 12. The upper end of the stand extension 12 is provided with a reduced portion 17 flush at the top with the top of the socket 15, as plainly shown in Fig. 2. A washer 18 extends on the tops of the reduced portion 17 and the socket 15, and a screw 19 engages the washer 18 and screws in the upper end of the stand extension 12 to hold the washer in place and thus prevent accidental disengagement of the socket or sleeve 15 from the stand extension 12 but to allow the socket or sleeve 15 to turn on the said stand extension 12. The socket 15 is provided with a flattened side 20 on the upper portion of which is secured a pivot 21 engaged by a bracket 25 provided with flanges 26 to which is secured a crosspiece 27 forming part of the body 28 of the display form. The body 28 is of usual construction and made hollow, and as it is attached to the bracket 25 and the latter is mounted to swing on the pivot 21 it is evident that the body 28 can be tilted forward or backward to assume a desired pose, as indicated in full and dotted lines in Fig. 1.

In order to hold the bracket 25 and the body 28 in the tilted position, use is made of a spring tension device arranged as follows: The lower portion of the bracket 25 is provided with a sidewise elongated opening 30 into which projects a boss 31 projecting from the flattened side 20 of the socket 15 and forming an integral part thereof. The boss 31 limits the swinging movement of the bracket 25 on coming in contact with the end walls of the elongated opening 30. On the boss 31 is secured a bolt 35 provided at its outer end with a wing nut 36, and on the said bolt is arranged a coiled spring 37 resting with its outer end against the wing nut 36 and resting at its inner end on a washer 38 bearing against the bracket 25 thus pressing the latter in firm frictional contact with the flattened side 20 of the socket 15 with a view to hold the bracket 25 and the body 28 firmly in the tilted position. It will be noticed that the user on adjusting the wing nut 36 can readily increase or decrease the tension of the spring 37 to cause the bracket 25 to be held with more or less force in frictional contact with the flattened side 20 of the socket 15 thus insuring a firm holding of the body 28 in the desired tilted position. The socket 15 is preferably provided with side flanges 40 to increase the area of the flattened side 20 and thus increase the frictional contact between the bracket 25 and the flattened side 20.

By reference to Fig. 1, it will be noticed that the pivot 21 is located approximately at or a short distance below the hips of the body 28 to permit of tilting the body 28 forward or backward to assume a desired artistic pose. It is understood that the body 28 can be readily turned around owing to the socket 15 being free to turn on the upper end of the stand extension 12 and a desired tilting position can be given to the body 28 as above explained.

Having thus described my invention, I claim as new and desire to secure by Letters Patent:—

1. In a display form, a socket mounted to turn on the stand of the display form and flattened at one side, a pivot on the flattened side, a bracket mounted to swing on the said pivot and to which the body of the display form is secured, the bracket having an elongated opening, a bolt attached to the said socket, and a tension spring held on the said bolt and pressing the said bracket to hold the latter in frictional contact with the said flattened side of the socket.

2. In a display form, a socket mounted to turn on the stand of the display form and flattened at one side, a boss on the flattened side of the socket a distance below the said pivot, a bracket mounted to swing on the said pivot and to which the body of the display form is secured, the bracket having an elongated opening through which extends the said boss, a bolt attached to the said boss and provided with a nut, a washer on the bolt engaging the said bracket, and a spring interposed between the washer and the nut to hold the bracket in frictional contact with the flattened side of the socket.

EMIL THEO. PALMENBERG.

Copies of this patent may be obtained for five cents each, by addressing the "Commissioner of Patents, Washington, D. C."